United States Patent
Gill et al.

(10) Patent No.: US 7,333,691 B1
(45) Date of Patent: Feb. 19, 2008

(54) LOW LOSS TUNABLE RING RESONATOR ALLPASS FILTER

(75) Inventors: Douglas M. Gill, South Orange, NJ (US); Sanjay Patel, New Providence, NJ (US); Mahmoud Rasras, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/618,349

(22) Filed: Dec. 29, 2006

(51) Int. Cl.
G02B 6/42 (2006.01)
H01S 3/00 (2006.01)

(52) U.S. Cl. .............. 385/32; 385/39; 385/14; 385/28; 385/31; 385/129; 385/130; 385/132; 359/344

(58) Field of Classification Search .......... 385/14, 385/24, 27, 28, 31, 32, 129, 130, 131, 132, 385/39; 372/94; 359/341.1, 341.3, 341.2, 359/344, 343
See application file for complete search history.

(56) References Cited

U.S. PATENT DOCUMENTS

| 4,630,885 | A | * | 12/1986 | Haavisto | 385/30 |
| 6,603,557 | B2 | * | 8/2003 | Mizutani | 356/459 |
| 6,665,476 | B2 | * | 12/2003 | Braun et al. | 385/50 |
| 6,885,794 | B2 | * | 4/2005 | Scheuer et al. | 385/39 |
| 6,947,642 | B2 | * | 9/2005 | Yamazaki | 385/39 |
| 2004/0008942 | A1 | * | 1/2004 | Scheuer et al. | 385/39 |
| 2004/0037497 | A1 | * | 2/2004 | Lee | 385/28 |
| 2005/0286602 | A1 | * | 12/2005 | Gunn et al. | 372/94 |

OTHER PUBLICATIONS

S.J. Spector, et al., "Hybrid Multi-Mode/Single-Mode Waveguides for Low Loss" Lincoln Laboratory, Massachusetts Institute of Technology, no date.
M.S. Rasras, et al., "Tunable Narrowband Optical Filter in CMOS" Optical Fiber Communication Conference, Mar. 5-10, 2006, pp. 1-4.

\* cited by examiner

*Primary Examiner*—Brian M. Healy

(57) ABSTRACT

An apparatus, including an optical ring resonator having a waveguide ring with substantially straight waveguide segments and bent waveguide segments. The bent waveguide segments are optically coupled to the substantially straight waveguide segments and have optical cores with substantially smaller cross-sectional areas than the substantially straight waveguide segments. The bent waveguide segments change a propagation direction of received light by more than ½ of a right angle.

20 Claims, 5 Drawing Sheets

US 7,333,691 B1

LOW LOSS TUNABLE RING RESONATOR ALLPASS FILTER

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. HR0011-05-C-0027 awarded by the Defense Advanced Research Projects Agency.

TECHNICAL FIELD OF THE INVENTION

The present invention is directed, in general, to an optical apparatus, and, more specifically, to an apparatus employing a planar optical waveguide with reduced waveguide loss.

BACKGROUND OF THE INVENTION

Planar optical waveguides are employed in optical devices to transmit an optical signal between two points and to construct optical components such as filters. Such waveguides may be fabricated from a semiconductor layer using photolithography and etching to produce a desired waveguide pattern.

SUMMARY OF THE INVENTION

One embodiment is an apparatus. The apparatus includes an optical ring resonator having a waveguide ring including substantially straight waveguide segments and bent waveguide segments. The bent waveguide segments are optically coupled to the substantially straight waveguide segments, and have optical cores with substantially smaller cross-sectional areas than the substantially straight waveguide segments. The bent waveguide sections change a propagation direction of received light by more than ½ of a right angle.

Another embodiment is a method. An optical signal is transmitted through a multi-mode waveguide segment in a substantially straight segment of the waveguide. A direction of propagation of the optical signal is then changed by transmitting the optical signal through a curved segment of the waveguide. The curved segment has a lateral width substantially smaller than a lateral width of the multi-mode waveguide segment. The changing includes converting a propagation mode of the optical signal from a fundamental mode in the multi-mode waveguide segment to a different fundamental mode in the curved segment.

BRIEF DESCRIPTION OF THE DRAWINGS

Various embodiments are understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION

Etch processing of waveguides generally results in roughness of sidewalls of the waveguide. This roughness may act to scatter energy in the optical signal, thus increasing attenuation of an optical signal transmitted through the waveguide. Moreover, optical filters using planar waveguides may be adversely affected by attenuation of optical signals in the waveguide. Such attenuation may lead to broadening of the filter response and to a reduction of transmission through the filter. While these effects can be partially compensated for by, e.g., additional gain stages, such strategies are only partially effective and consume additional power and space. In addition, they add noise to the optical signal.

The embodiments described herein recognize that the performance of an optical filter may be improved by reducing losses in planar waveguides used to implement the filter. As set forth below, these losses may be reduced by providing a waveguide core width proportional to a radius of curvature of the waveguide path. In another aspect, multi-mode waveguides may be used in substantially straight segments of the filter layout, while single-mode waveguides are used in bent segments of the layout. Thus, overall filter losses are reduced while avoiding excitation of higher-order optical modes.

Those skilled in the optical arts will immediately recognize that an optical waveguide includes a core region with a relatively higher index of refraction ($n_j$), and a cladding region that includes a relatively lower $n_j$. A propagating signal is generally confined to the core region, though some signal energy may be present in the cladding region as, e.g., an evanescent wave. In the figures that follow, waveguides are represented by the core regions, and it is assumed that regions of lower $n_j$ are present outside the core regions. Where a width of a waveguide is described, the width refers to the width of the core region in the direction perpendicular to the average direction of signal propagation through the core. Moreover, bends shown in the figures are schematic in nature, and may not necessarily reflect the radius of curvature of an actual waveguide path.

Figure 1:
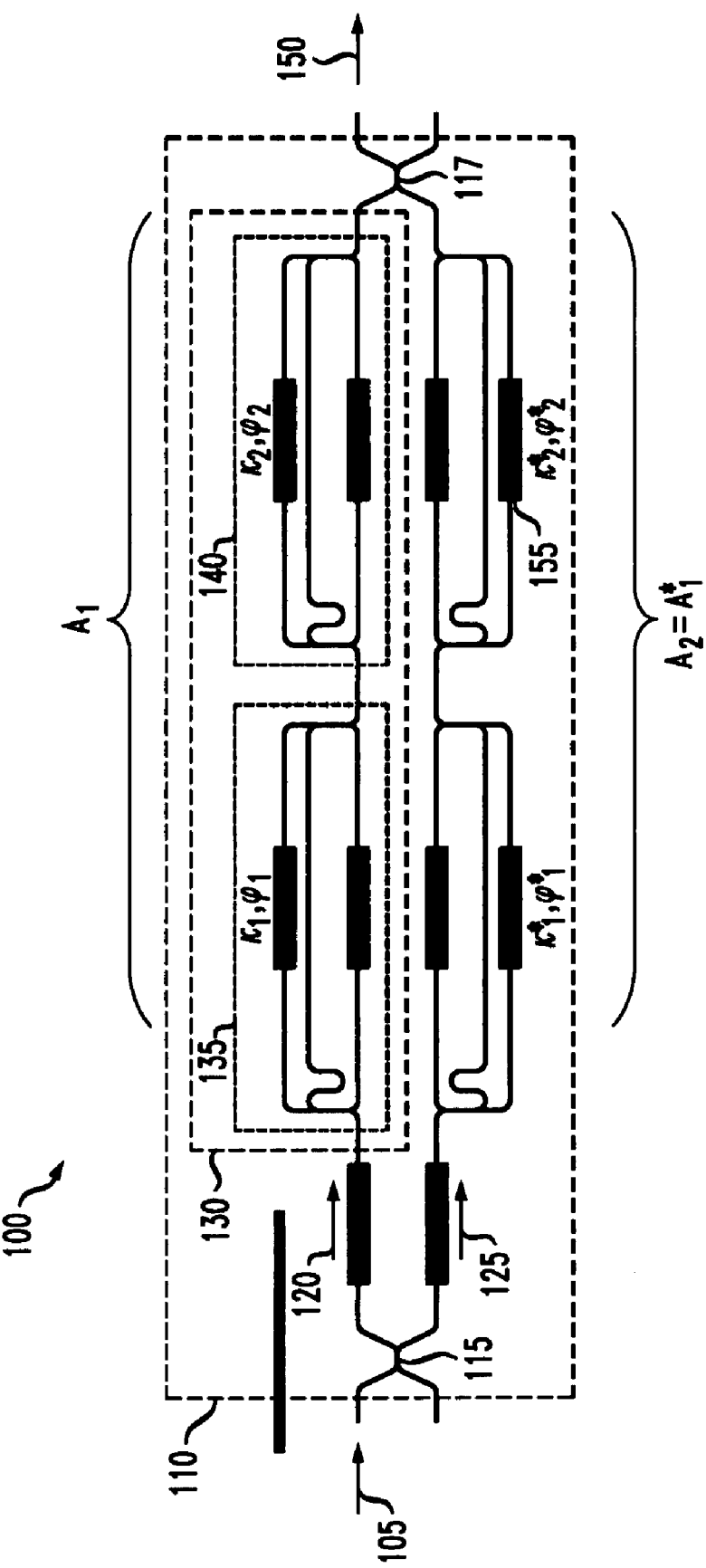
FIG. 1 illustrates a 4$^{th}$ order pole-zero optical filter.

FIG. 1 illustrates a 4th order pole/zero filter 100. An optical signal 105 is input to a Mach-Zehnder interferometer (MZI) 110. The MZI 110 includes a 3-dB input coupler 115, an upper arm 120, a lower arm 125, and a 3-dB output coupler 117. The coupler 115 splits the optical signal 105 between the upper arm 120 and the lower arm 125. The upper arm 120 and the lower arm 125 are designed to be nominally identical, so the description of both arms is made with reference only to the upper arm 120. The upper arm 120 includes a cascade 130 of two nominally identical ring resonators 135, 140. The optical signals in the arms 120, 125 are recombined by the output coupler 117 to produce an output signal 150. The ring resonators 135, 140 are configured as all-pass filters (APFs). Those skilled in the art appreciate that an APF is a filter that passes a signal with frequencies within a range of interest without substantial attenuation, but imposes a time delay spectrum on the signal, with delay peaks separated by a free spectral range (FSR). The characteristics of each APF may be adjusted independently by use of phase adjusters 155.

Figure 2:
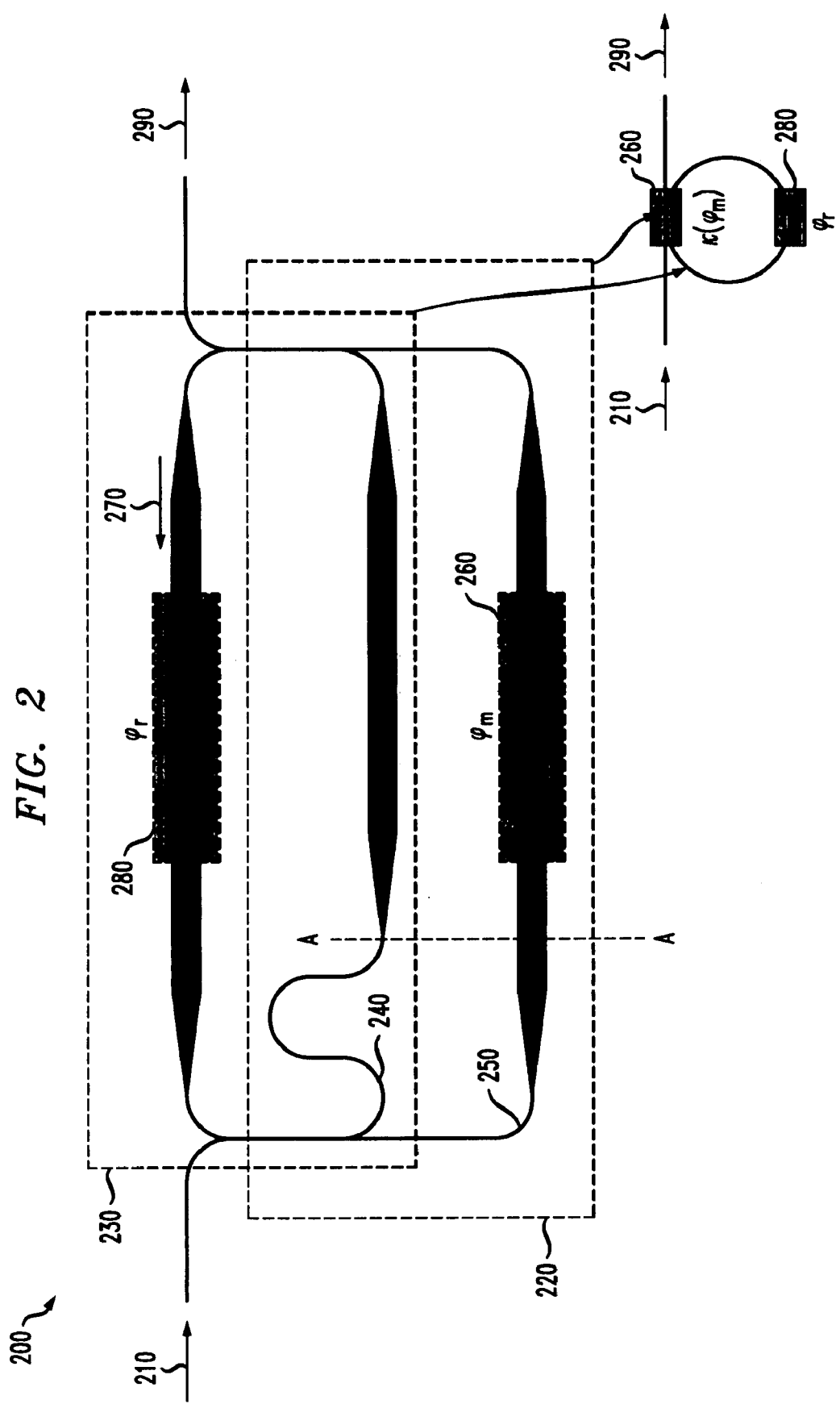
FIG. 2 illustrates an embodiment of an all-pass filter.

A single ring resonator 200 is illustrated in FIG. 2. An optical signal 210 enters the ring resonator 200 and is split between an MZI 220 and a waveguide ring 230. The coupling between the MZI 220 and the waveguide ring 230 can be varied by adjusting a phase delay between an upper MZI arm 240 and a lower MZI arm 250. The phase delay may be adjusted using a phase adjuster 260, which adds a phase change of $\phi_m$ to the portion of the signal 210 passing through the lower MZI arm 250. The phase change may be produced conventionally, by, e.g., a heater element, an electro-optic effect, or charge injection to produce a local change of the $n_i$ of the waveguide. A portion 270 of the optical signal 210 is coupled into the waveguide ring 230, and may then recombine with the signal 210. A phase adjuster 280 may be used to impose a phase delay $\phi_r$ on the signal portion 270 to adjust the response of the ring resonator 200. An output signal 290 is output by the ring resonator 200.

The filter response of the filter 100 can be tailored by tuning the zeros and the poles of the individual APFs. This is accomplished by changing the strength of the coupling ($\kappa$), via $\phi_m$, between the MZI 220 and the waveguide ring 230 while tuning the resonant frequency of the waveguide ring 230 via the resonator phase ($\phi_r$). The APFs on the upper arm 120 may be set to have a complex conjugate response of the APFs on the lower arm 125. The output coupler 117 then serves to add and subtract the APF responses from the arms 120, 125.

This pole/zero filter design requires fewer stages than an all-pole filter to attain a narrow passband response, making the tuning of this filter easier to control. This architecture also offers flexibility in tailoring the ripple in the passband and the stopband since the same physical device can be dynamically tuned to create a Butterworth, Chebyshev or elliptic filter response. The response of the filter 100 is periodic with the FSR of the APFs, and the filter order is determined by the total number of rings.

Figure 3:
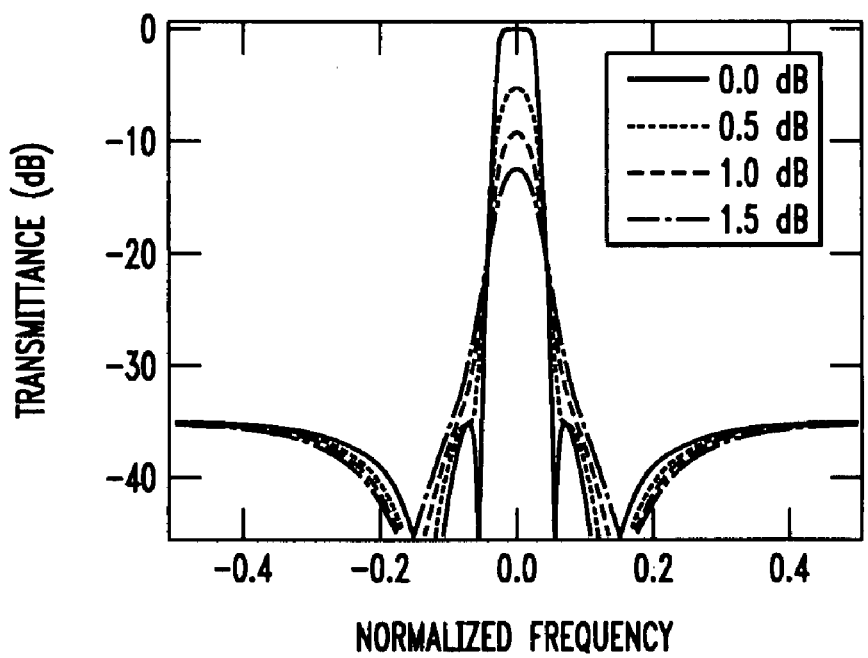
FIG. 3 illustrates calculated filter responses for different ring round trip loss values.

Attenuation of the signal 210 by waveguide propagation loss degrades the filter response. The filter response as a function of round trip loss in the waveguide ring 230 is depicted in FIG. 3 for passbands with a nominal 3-dB bandwidth of 1 GHz. These curves are calculated for an elliptic filter response. The ring round trip losses cause rounding of the passband. The effect of this loss on the shape of the passband can be understood by considering the resonant characteristics of the APFs. A narrow bandpass filter requires sharp transitions from the stopband to the passband. Such sharp transitions are possible due to the resonant characteristics of the APFs. Light at the resonant frequencies will make many round trips in the ring leading to higher optical losses at these frequencies. This causes an imbalance in the optical power between the upper and lower MZI arms at these frequencies, which leads to degradation of the filter response.

Loss in a planar optical waveguide is thought to result in part from scattering of the optical signal from roughness on the sidewalls of the waveguides. As discussed further below, such roughness is a general byproduct of CMOS fabrication processes used to fabricate planar semiconductor waveguides such as silicon waveguides. To some extent, such losses may be reduced using conventional techniques to reduce sidewall roughness, such as oxidation of the waveguide. However, as described herein, waveguide losses in an optical apparatus may be advantageously further reduced by using a combination of single-mode and multi-mode waveguide segments in the apparatus.

It will be appreciated that optical signals may propagate in a waveguide in a fundamental mode or a higher-order mode. While all modes may reflect from the waveguide sidewall, a signal propagating in the fundamental mode has a longer path length between reflections than the higher-order modes. In another aspect, the angle of reflection of the signal in the fundamental mode is shallower than the angle in the higher-order modes. As a result, the propagation speed of the fundamental mode is greater than that of the higher order modes. Also, because the signal experiences fewer reflections for a constant path length, attenuation of the optical signal is lower for the signal propagating in the fundamental mode than in the higher order modes.

However, if the width of the waveguide is sufficient, it will support propagation of both fundamental and higher-order modes. Such a waveguide is generally known as and is referred to herein as a multi-mode waveguide. When higher-order propagation modes are excited in a multi-mode waveguide, undesirable effects may result, such as chromatic dispersion of the optical signal. Moreover, if a higher-order component of the optical signal (i.e., a portion of the light traveling as a higher order mode) encounters a waveguide segment that is only wide enough to support the fundamental propagation mode (i.e., a single-mode waveguide), that component is generally filtered out of the signal. This filtering results in further attenuation of the signal.

The embodiments described herein recognize that filter performance may be improved when a combination of single-mode and wider waveguides is used in the optical paths of the filter. Filter losses are reduced by the use of the multi-mode waveguides in substantially straight waveguide segments. Where a bend is needed in a waveguide path, a single-mode waveguide is used to substantially prevent excitation of higher-order modes in the bend. A transition is provided between multi-mode waveguide segments and single-mode waveguide segments to convert the single-mode signal in one waveguide width to a single-mode signal in the other waveguide width without substantially exciting higher-order modes. The benefit provided by using the wider, multi-mode waveguides may be particularly significant when the multi-mode waveguide used in substantially straight waveguide segments makes up more that about one-half of the total length of the waveguide in the waveguide ring.

In some embodiments, a segment is substantially straight when a bend radius of the segment is greater than a minimum bend radius below which excessive radiation losses occur. In some cases, the minimum bend radius may depend on the width of the waveguide core or whether the optical signal is propagating in TE or TM mode. In a non-limiting example, the minimum bend radius of a 0.5 µm silicon waveguide with a TE mode signal propagating therethrough may be about 2 µm. In another example, the same waveguide with a TM signal propagating therethrough may have a minimum bend radius of about 10 µm. In other embodiments, the waveguide segment is substantially straight when its bend radius is greater than about ten times the minimum bend radius. In other embodiments, the waveguide segment is substantially straight when its bend radius is greater than about fifty times the minimum bend radius.

Returning to FIG. 2, an example of such a combination of single-mode and multi-mode waveguide segments is illustrated in the ring resonator 200. In the illustrated embodiment, substantially straight segments of the waveguides are implemented as relatively wider, multi-mode waveguides. However, bent (or curved) segments of waveguides in the ring resonator 200 are implemented using single-mode waveguides narrower than the multi-mode waveguides. A waveguide segment with tapered width couples single-mode waveguide segments to multi-mode waveguide segments.

Figure 4:
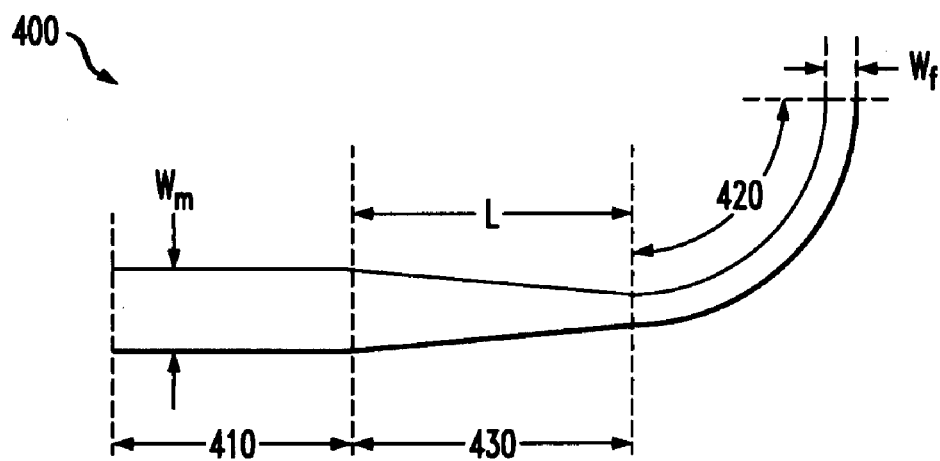
FIG. 4 illustrates a tapered transition from a narrow waveguide to a wide waveguide.

This concept is illustrated in greater detail in FIG. 4, which illustrates an example waveguide 400. The waveguide includes a wide, multimode, waveguide segment 410 in a substantially straight portion of the waveguide 400, and a narrow, single-mode waveguide segment 420 in a bent portion of the waveguide 400. The multimode segment 410 and the single-mode segment 420 are optically coupled by a tapered transition segment 430. In one aspect, the multimode segment 410 is wider than the single-mode segment 420. In some embodiments, the multimode segment 410 is wide enough to support higher order propagation modes of the signal. The single-mode segment 420 is used to change the direction of propagation of the signal. In another aspect, the single-mode segment 420 has a width $W_f$ designed to suppress propagation of modes other than the fundamental mode of the signal. The change of direction may be about a right angle, as shown, or may be a direction change of another value as determined by requirements of a design. In some cases, the change of direction will be, at least, about ½ of a right angle. In other cases, the change of direction will be about 90 or about 180 degrees.

The tapered segment 430 coupling the multi-mode segment 410 and the single-mode segment 420 is designed to be adiabatic. In other words, the tapered segment 430 is designed such that substantially all the energy of the signal propagating in the fundamental mode of the single-mode segment 420 is transferred to a signal propagating in the fundamental mode of the multi-mode segment 410. Conversely, substantially all the energy of the signal propagating in the fundamental mode of the multi-mode segment 410 is transferred to a signal propagating in the fundamental mode of the single-mode segment 420. In this manner, the segment 430 acts as a mode-converter.

In order to behave adiabatically, the tapered segment 430 generally is smoothly tapered and has a length L greater than a minimum value. The minimum value is related to the difference in core width between the segments 410, 420, and the wavelength of the optical signal. An example is provided without limitation assuming a signal with a wavelength of 1.5 µm, a commonly used wavelength in optical communications technology. In this case, when a waveguide with a 0.5 µm width is coupled by a tapered waveguide segment to a waveguide with a 3.0 µm width, the tapered segment may behave adiabatically when it has a minimum length L of about 50 µm.

A higher-order mode may be excited when the signal propagates through a bent portion of the waveguide. In this portion, the peak of the single mode optical field distribution may be displaced from the center of the waveguide, and thereby transfer energy to a higher order mode. To the extent that higher-order modes are excited as the signal propagates from the bent single-mode segment 420 to the multi-mode segment 410, such modes will be substantially filtered out when the signal encounters another single-mode waveguide segment. While such filtering contributes to signal attenuation, signal dispersion is thereby substantially reduced.

Figure 5:
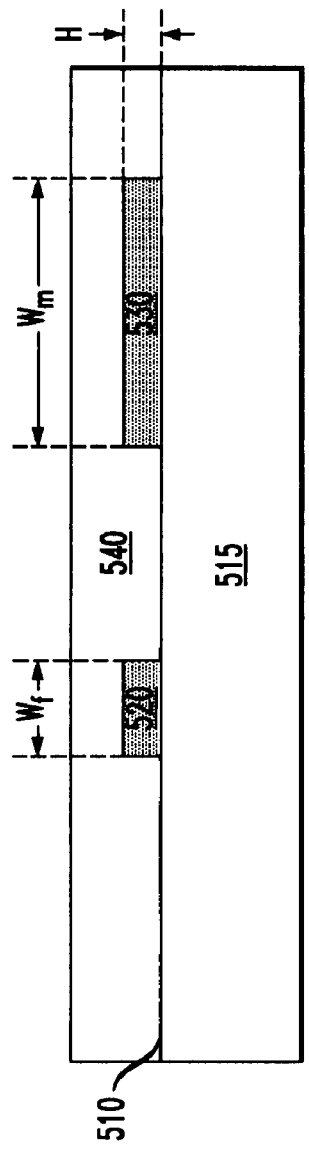
FIG. 5 illustrates a single-mode and a multi-mode waveguide.

FIG. 5 illustrates a sectional view the ring resonator 200 at section A-A of FIG. 2. In one aspect, the ring resonator 200 may be located along a top surface 510 of a substrate 515. In another aspect, the substrate 515 may be a dielectric, such as silicon dioxide, having a relatively lower index of refraction than the core regions of optical waveguides of the ring resonator 200. In another aspect, the substrate may be a semiconductor-on-insulator (SOI) substrate, or may be a substrate on which a dielectric layer has been formed by any means. Waveguide cores 520, 530 may be formed of a semiconducting material with a relatively large index of refraction, such as silicon. A layer of the core material may be patterned using conventional photolithographic techniques, including, e.g., plasma etching. As previously described, such patterning generally results in roughness of the waveguide sidewall.

A dielectric layer 540 may be formed over the waveguide cores 520, 530 and may be of the same material as the substrate 515. The substrate 515 and the dielectric layer 540 act as a cladding of the waveguide cores 520, 530. When silicon, with an $n_i$ of about 3.45, is used as the waveguide core material and silicon dioxide (with a relatively lower $n_i$ of about 1.45) is used as the cladding, light is effectively confined in the waveguide by total internal reflection. Of course, other semiconductors such as GaAs and Ge could be used for the waveguide cores 520, 530. Other dielectric materials compatible with the chosen waveguide material could also be used as the cladding. In some cases, the cladding will be an oxide of the core material.

While these embodiments employ a semiconductor as the core material, it should be recognized, and is explicitly contemplated, that the principles herein may be applied to any planar optical waveguide. However, greater benefit is realized for waveguides with a greater difference between the $n_i$ of the core and the cladding. Semiconductor waveguides are a class of waveguides for which this greater benefit is realized.

In FIG. 5, the waveguide cores 520, 530 have a height H that may be substantially similar. The waveguide core 520 has a width $W_f$ that is chosen to support only the fundamental propagation mode of the optical signal with wavelength λ passing therethrough. The waveguide core 530 has a width $W_m$, wider than $W_f$ that may support multiple propagation modes, as previously described. Thus, the cross-sectional area of the waveguide core 520 is significantly smaller than the cross-sectional area of the waveguide core 530. The loss per unit length of the waveguide core 520 may be significantly higher than the unit loss of the waveguide core 530.

Characteristics of example waveguides are presented without limitation for illustration. When λ of an optical signal is about 1.55 µm, the waveguide core 520 may have a width of about 0.5 µm to propagate essentially only the fundamental mode of the signal. The width $W_m$ of the waveguide core 530 may be chosen to range from about 1.0 µm to about 3.0 µm to propagate the signal with lower loss. The cross-sectional area of the waveguide core 520 in this case is only about 30-50% of the cross-sectional area of the waveguide core 530. When Si is used as the core material and silicon dioxide as the cladding, the waveguide core 520 will have a unit loss of about 4.0 db/mm. In contrast, the waveguide core 530 will have a unit loss ranging from about 0.35 db/mm to about 1.5 db/mm for the fundamental mode, though the loss may be higher for higher-order modes of propagation.

Figure 6:
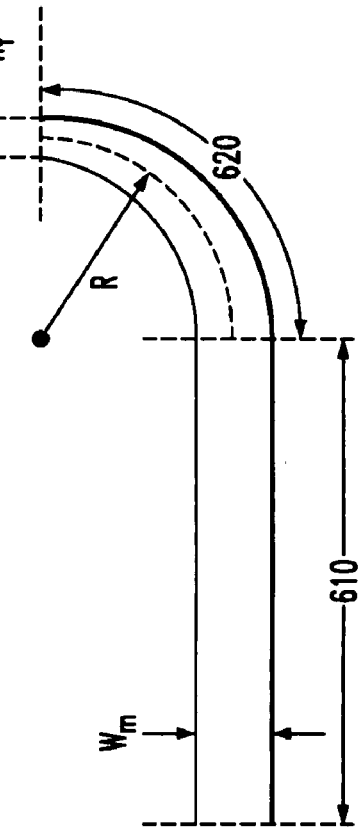
FIG. 6 illustrates a tapered bent waveguide.

Turning now to FIG. 6, an embodiment is illustrated in which a taper is incorporated into a bent portion of the waveguide. A substantially straight waveguide segment 610 is connected to a bent segment 620. While the bent segment 620 is shown as a 90° bend, in other embodiments the change of direction may be greater or less than a right angle. At the point of contact the straight segment 610 and the bent segment 620 have a lateral width $W_m$. The width of the bent segment 620 varies adiabatically to a lateral width $W_f$, the width at which only the fundamental mode propagates.

Because the bent segment 620 has a minimum width of $W_f$, the bent segment 620 is regarded as a single-mode segment. The bent segment 620 has a radius of curvature R, which is approximately constant in the illustrated embodiment. In other embodiments, the radius of curvature may be varied, and in some cases may be proportional to the lateral width of the bent segment 620.

The configuration of FIG. 6 advantageously increases the length of substantially straight waveguide having larger width and lower loss. However, the tapered bend may increase the amount of energy coupled into higher-order modes. To the extent that energy is transferred to a higher-order mode, a significant portion of this energy will be filtered out when the optical signal encounters a later single-mode width of the waveguide. While this filtering results in signal attenuation, such losses may be offset by the lower loss of the additional length of the wide waveguide to result in a net benefit.

Figure 7:
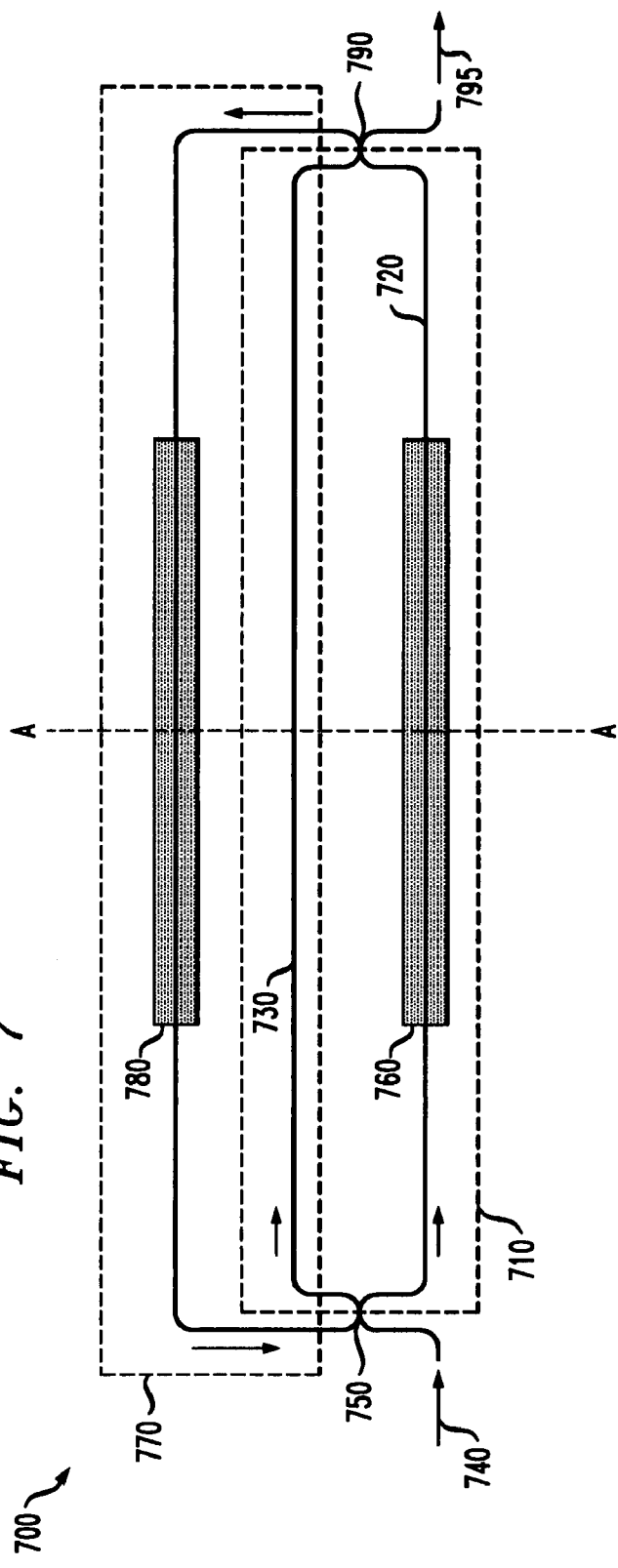
FIG. 7 illustrates an embodiment of an all-pass filter.

Now turning to FIG. 7, an APF 700 with an alternate layout is illustrated. In one aspect of the layout, the optical paths of the APF 700 are symmetric about a reference line A-A. An MZI 710 includes a lower arm 720 and an upper arm 730. An input signal 740 is split between the lower arm 720 and the upper arm 730 by a splitter/combiner 750. The physical path lengths of the lower arm 720 and the upper arm 730 are designed to be equal, with the optical path length of the lower arm 720 being adjustable by a phase control element 760. A portion of the input signal 740 is coupled into a resonator ring 770 that includes the upper arm 730. A phase control element 780 is used to provide a controlled phase delay through the resonator ring 770. A portion of the optical signal in the resonator ring 770 is combined with the portion of the optical signal in the MZI via splitter/combiners 750, 790 to produce the output signal 795.

A large proportion of the optical path of the APF 700 is designed to be substantially straight. Use of tapered bends as illustrated in FIG. 6 may increase the proportion of substantially straight waveguide. When multimode waveguides are used in the substantially straight segments, the APF 700 may have advantageously low signal attenuation. Because the performance of the filter 100 is improved when the signal attenuation is lower, it is thought that the filter 100 using the APF 700 designed in this manner will result in equal or superior performance to the filter 100 using the ring resonator 200.

Another embodiment is a method including reducing signal loss of an optical signal in a waveguide. The optical signal is transmitted in a multi-mode waveguide segment in a substantially straight segment of the waveguide. A direction of propagation of the optical signal is changed by a curved segment of the waveguide having a lateral width substantially smaller than a lateral width of the multi-mode waveguide segment. A propagation mode of the optical signal is converted between a fundamental mode in the multi-mode waveguide segment and a fundamental mode in the curved segment.

Table 1 illustrates an embodiment of the method in the form of design rules for an optical filter. In this embodiment, a single-mode waveguide is used in curved segments of the waveguide. When a substantially straight waveguide segment is long enough to provide an adiabatic tapered transition from a single-mode waveguide segment to a multi-mode segment, a tapered transition is used. For a straight waveguide segment with a length greater than an adiabatic transition, the transition is used and a multi-mode waveguide is used for the remaining length of the segment. If, however, a straight segment is too short to provide an adiabatic transition, a single-mode waveguide is used. In some cases, other embodiments of the method use a tapered curved segment. In such embodiments, straight adiabatic transition segments may not be necessary. While these example design rules have been illustrated in the context of the filter 100, they are applicable to any optical design that may be configured with curved waveguides and substantially straight waveguides long enough to incorporate adiabatic transitions.

TABLE 1

| Waveguide segment type | Segment Width |
|---|---|
| Bent | Single-mode |
| Straight | |
| Long enough to provide an adiabatic transition | Tapered transition, remainder multi-mode |
| Too short for an adiabatic transition | Single-mode |

Another embodiment is a system. The system includes an optical signal source configured to provide an optical signal. An optical ring resonator is coupled to the signal source and has a waveguide ring including substantially straight waveguide segments and corner waveguide segments located between the substantially straight waveguide segments. The corner waveguide segments have optical cores with substantially smaller cross-sectional areas than the substantially straight waveguide segments.

Figure 8:
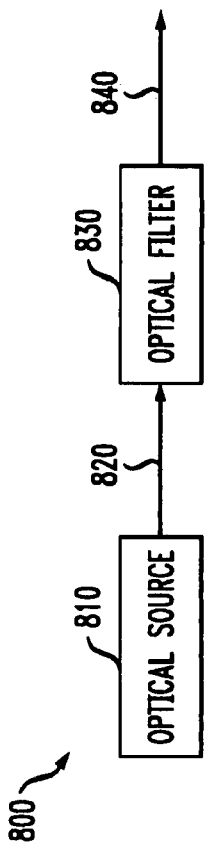
FIG. 8 illustrates an optical system.

An embodiment of a system is illustrated in FIG. 8. An optical communications system 800 includes an optical source 810 configured to provide an optical signal 820. In some cases, the optical signal is modulated to transmit encoded data. The optical signal 820 is received by an optical filter 830 designed as described herein. The optical filter may include bent waveguide segments that are formed from a single-mode waveguide. Substantially straight waveguide segments in the optical filter 830 may have a width that supports higher-order propagation modes. The single-mode waveguide segments and the multi-mode segments may be coupled by an adiabatic tapered segment. A filtered optical signal 840 is output by the optical filter 830.

Although the present invention has been described in detail, those skilled in the art should understand that they can make various changes, substitutions and alterations herein without departing from the spirit and scope of the invention in its broadest form.

What is claimed is:

1. An apparatus, comprising:
   an optical ring resonator having a waveguide ring including substantially straight waveguide segments and bent waveguide segments, the bent waveguide segments optically coupled to the substantially straight waveguide segments; and
   wherein the bent waveguide segments have optical cores with substantially smaller cross-sectional areas than the substantially straight waveguide segments; and
   wherein the bent waveguide segments change a propagation direction of received light by more than ½ of a right angle.

2. The apparatus of claim 1, further comprising:
   a substrate with a top surface, the optical ring resonator located along the top surface; and wherein a lateral width of each bent waveguide segment varies adiabatically between a minimum width and a lateral width of the substantially straight waveguide segments.

3. The apparatus of claim 1, wherein the bent waveguide segments are able to operate as substantially single-mode waveguides at a wavelength that the substantially straight waveguide segments operate as multi-mode waveguides.

4. The apparatus of claim 1, wherein the ring further comprises a Mach-Zehnder interferometer connected between two of the bent waveguide segments.

5. The apparatus of claim 1, wherein the substantially straight waveguide segments form more than ½ the length of the waveguide ring.

6. The apparatus of claim 1, wherein the straight waveguide segments are coupled to the bent waveguide segments by a tapered waveguide segment.

7. The apparatus of claim 1, wherein the waveguides have a semiconducting core.

8. The apparatus of claim 1, further comprising an optical signal source configured to provide an optical signal to the optical ring resonator.

9. The apparatus of claim 1, wherein the optical ring resonator is included in an arm of a Mach-Zehnder interferometer.

10. The apparatus of claim 9, wherein a plurality of optical ring resonators are cascaded in the arm of the Mach-Zehnder interferometer.

11. The apparatus of claim 1, wherein the optical ring resonator includes a plurality of coupled rings.

12. The apparatus of claim 11, further comprising a phase adjuster to vary a coupling between coupled rings.

13. A method, comprising:
  transmitting the optical signal through a multi-mode waveguide segment in a substantially straight segment of the waveguide;
  then, changing a direction of propagation of the optical signal by transmitting the optical signal through a curved segment of the waveguide having a lateral width substantially smaller than a lateral width of the multi-mode waveguide segment; and
  wherein the changing includes converting a propagation mode of the optical signal from a fundamental mode in the multi-mode waveguide segment to a different fundamental mode in the curved segment.

14. The method of claim 13, wherein the lateral width of the curved segment varies adiabatically between a minimum lateral width and the lateral width of the multi-mode waveguide segment.

15. The method of claim 14, wherein the minimum lateral width is about 0.5 µm.

16. The method of claim 14, wherein the lateral width of the multi-mode waveguide segment ranges from about 1.0 to about 3.0 µm.

17. The method of claim 13, wherein the multimode waveguide segment forms at least a portion of an optical ring resonator.

18. The method of claim 17, wherein the optical ring resonator is included in an arm of a Mach-Zehnder interferometer.

19. The method of claim 17, wherein an optical path length of the optical ring resonator is configured to be changed by a phase adjuster.

20. The method of claim 17, wherein the optical ring resonator is cascaded with a second different optical ring resonator.

* * * * *